United States Patent
Lee et al.

(10) Patent No.: US 12,353,544 B2
(45) Date of Patent: Jul. 8, 2025

(54) METHOD FOR DETECTING AND RESPONDING FOR ATTACK ON CAN NETWORK

(71) Applicant: Korea University Research and Business Foundation, Seoul (KR)

(72) Inventors: Dong Hoon Lee, Seoul (KR); Seyoung Lee, Wonju-si (KR)

(73) Assignee: Korea University Research and Business Foundation, Seoul (KR)

(*) Notice: Subject to any disclaimer, the term of this patent is extended or adjusted under 35 U.S.C. 154(b) by 159 days.

(21) Appl. No.: 17/993,036

(22) Filed: Nov. 23, 2022

(65) Prior Publication Data
US 2023/0161878 A1  May 25, 2023

(30) Foreign Application Priority Data
Nov. 25, 2021 (KR) .......... 10-2021-0163927
Mar. 10, 2022 (KR) .......... 10-2022-0029948

(51) Int. Cl.
  *G06F 21/55* (2013.01)
  *G06F 21/56* (2013.01)
(52) U.S. Cl.
  CPC .......... *G06F 21/554* (2013.01); *G06F 21/566* (2013.01); *G06F 2221/034* (2013.01)

(58) Field of Classification Search
CPC . G06F 21/554; G06F 21/566; G06F 2221/034
See application file for complete search history.

(56) References Cited

U.S. PATENT DOCUMENTS

| 10,124,764 | B1* | 11/2018 | Ahmed ................. B60R 16/023 |
| 2008/0276111 | A1* | 11/2008 | Jacoby ................ G06F 11/3062 713/340 |
| 2015/0185262 | A1* | 7/2015 | Song ...................... G06N 20/10 702/64 |
| 2018/0270196 | A1* | 9/2018 | Bathurst ............. H04L 63/1416 |
| 2019/0026103 | A1* | 1/2019 | Van Der Maas ... G06F 11/0784 |
| 2021/0013884 | A1* | 1/2021 | Yano ............... H03K 19/018514 |
| 2022/0294638 | A1* | 9/2022 | Quigley .................. G06F 18/22 |

FOREIGN PATENT DOCUMENTS

| KR | 101734505 B1 * | 5/2017 |
| KR | 10-2159136 B1 | 9/2020 |
| KR | 10-2021-0075458 A | 6/2021 |

* cited by examiner

Primary Examiner — Khalid M Almaghayreh
(74) Attorney, Agent, or Firm — NSIP Law

(57) ABSTRACT

Disclosed is a method of detecting and responding to an attack, the method being performed by a computing device, the method including: obtaining a Controller Area Network (CAN) message from a bus of a CAN; obtaining a first voltage level based on the CAN message; and comparing the first voltage level with a preset normal voltage level to determine whether there is an attack.

10 Claims, 9 Drawing Sheets

[FIG. 1]
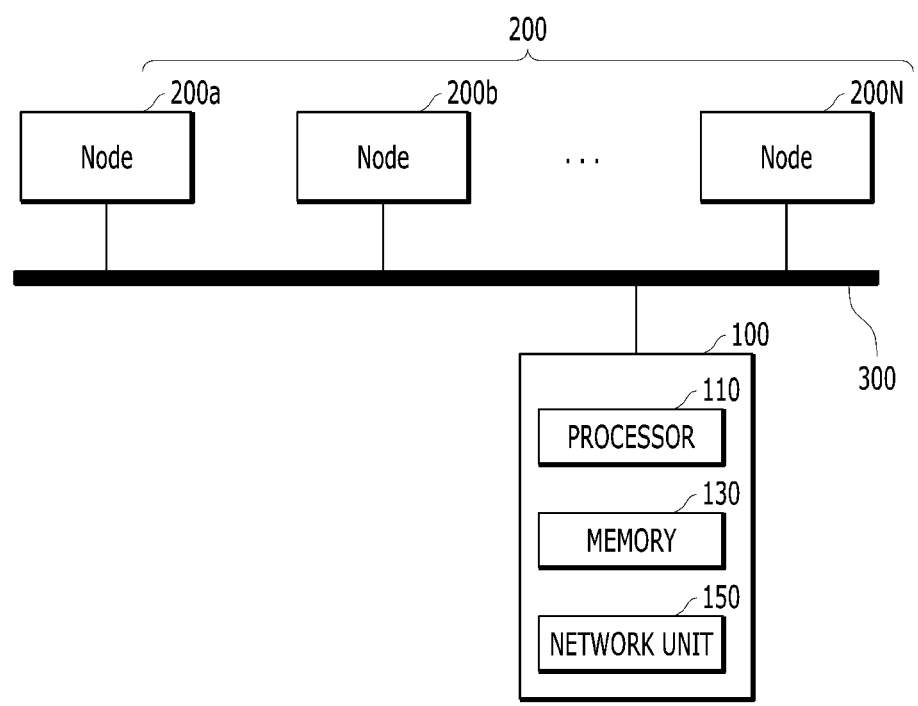

[FIG. 2]
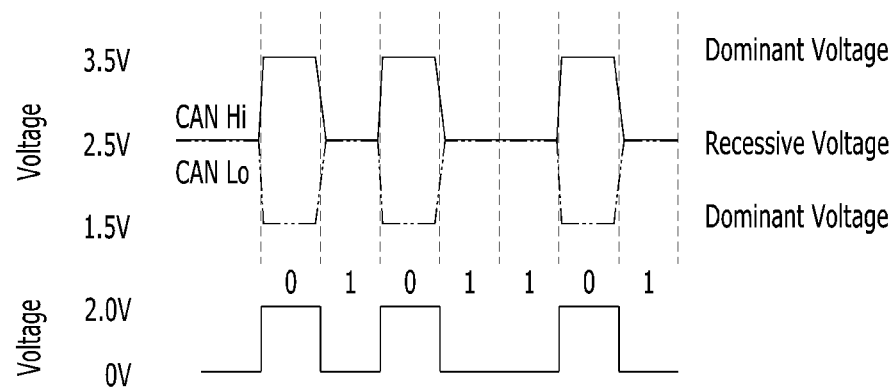

[FIG. 3]
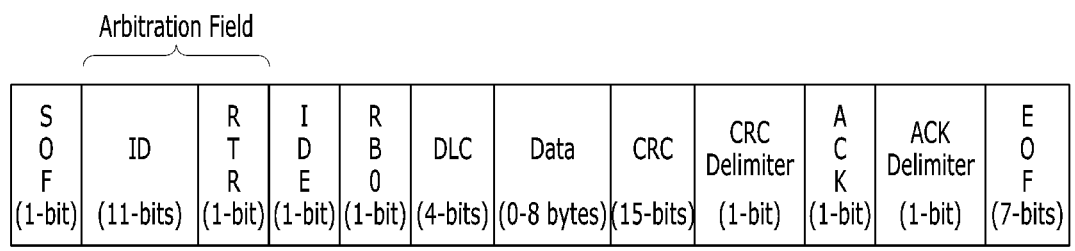

[FIG. 4]

|  | SOF (1-bit) | ID (11-bits) | | | | | | | | | | | RTR (1-bit) | Rest of Frame |
|---|---|---|---|---|---|---|---|---|---|---|---|---|---|---|
| ECU A | 0 | 0 | 0 | 1 | 0 | 0 | 0 | 0 | 1 | 0 | 1 | 0 | 0 | ... |
| ECU B | 0 | 0 | 0 | 1 | 0 | 0 | 1 | | | | | | | No Transmission (loses arbitration) |
| ECU C | 0 | 0 | 0 | 1 | 0 | 0 | 0 | 0 | 1 | 1 | | | | No Transmission (loses arbitration) |
| CAN Bus | 0 | 0 | 0 | 1 | 0 | 0 | 0 | 0 | 1 | 0 | 1 | 0 | 0 | ... |

[FIG. 5]

| | SOF (1-bit) | ID (11-bits) | | | | | | | | | | | RTR (1-bit) | IDE (1-bit) | RB0 (1-bit) | DLC (4-bits) | | | | ... |
|---|---|---|---|---|---|---|---|---|---|---|---|---|---|---|---|---|---|---|---|---|
| Target ECU | 0 | 0 | 0 | 1 | 0 | 0 | 0 | 0 | 1 | 0 | 1 | 0 | 0 | 0 | 0 | 0 | 0 | 0 | 1 | Error Frame |
| Attack ECU | 0 | 0 | 0 | 1 | 0 | 0 | 0 | 0 | 1 | 0 | 1 | 0 | 0 | 0 | 0 | 0 | 0 | 0 | 0 | Error Frame |
| CAN Bus | 0 | 0 | 0 | 1 | 0 | 0 | 0 | 0 | 1 | 0 | 1 | 0 | 0 | 0 | 0 | 0 | 0 | 0 | 0 | Error Frame |

(Arbitration Field spans SOF through RB0)

[FIG. 6]
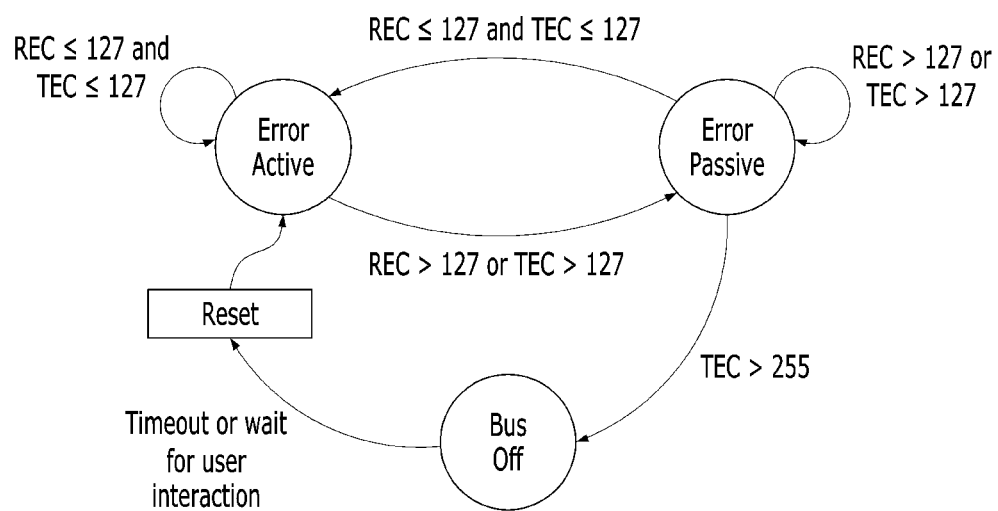

[FIG. 7]
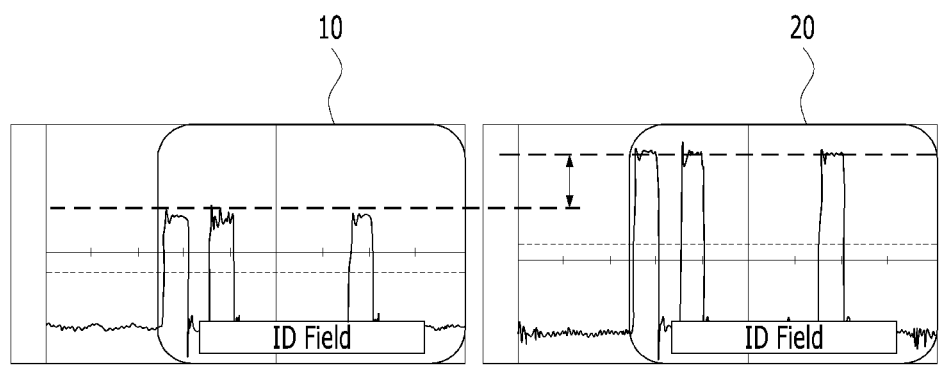

[FIG. 8]
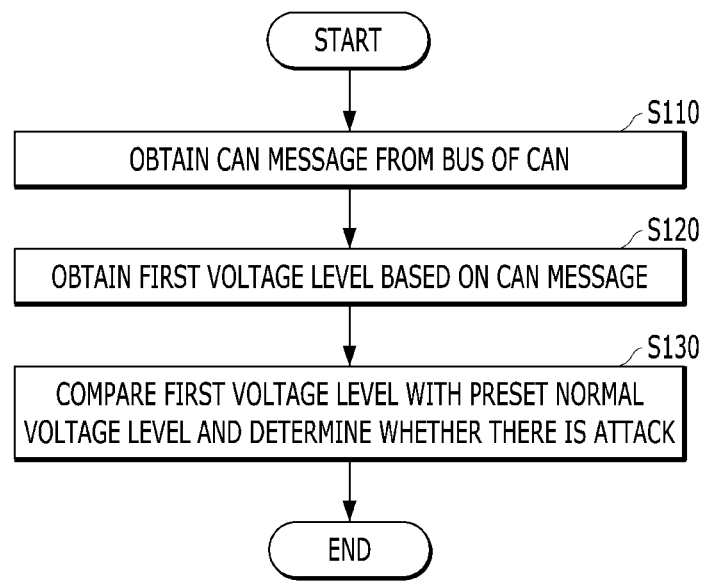

[FIG. 9]
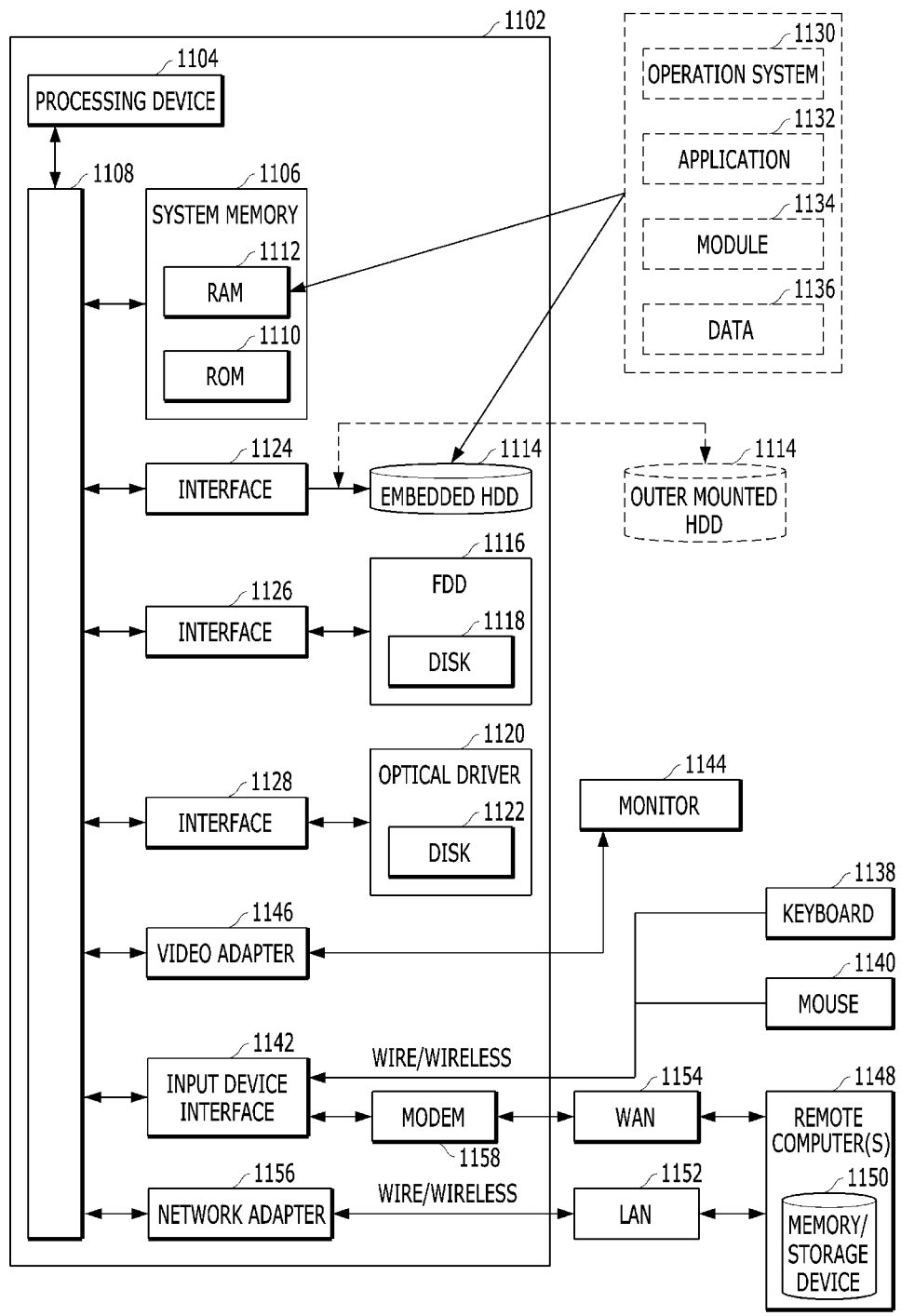

METHOD FOR DETECTING AND RESPONDING FOR ATTACK ON CAN NETWORK

CROSS REFERENCE TO RELATED APPLICATIONS

This application claims priority to and the benefit of Korean Patent Application No. 10-2021-0163927 filed in the Korean Intellectual Property Office on Nov. 25, 2021, and No. 10-2022-0029948 filed in the Korean Intellectual Property Office on Mar. 10, 2022, the entire contents of which are incorporated herein by reference.

TECHNICAL FIELD

The present disclosure relates to the field of network management, and more particularly, to a method of detecting and responding to an attack in a Controller Area Network (CAN).

BACKGROUND ART

The CAN was developed as an in-vehicle network in the 1980s, and is currently the most used in-vehicle network protocol due to its stability and efficiency. A plurality of nodes (for example, Electronic Control Units (ECUs)) transmit messages to each other through a CAN protocol, and exchange information about a vehicle state and control the vehicle. The CAN protocol structure may be a structure in which a plurality of nodes is connected to a bus of the CAN by wire by using one communication cable to perform communication in a broadcasting method.

When the plurality of nodes connected to the bus of the CAN is subjected to bus-off attacks and forcibly switched to a bus-off state, communication may become impossible.

The bus-off attack is an attack that exploits error handling that recognizes errors generated in the CAN and the fault confinement mechanism that responds to recognized errors, and may be an attack in which an attacker intentionally switches a state of a target node into a bus-off state.

PRIOR ART LITERATURE

Patent Document

Korean Patent No. 10-1704300 (Feb. 1, 2017)

SUMMARY OF THE INVENTION

The present disclosure has been conceived in response to the foregoing background art, and has been made in an effort to provide a method of detecting and responding to attacks in a Controller Area Network (CAN).

The technical objects of the present disclosure are not limited to the foregoing technical objects, and other non-mentioned technical objects will be clearly understood by those skilled in the art from the description below.

In order to solve the foregoing object, an exemplary embodiment of the present disclosure discloses a method of detecting and responding to an attack, the method being performed by a computing device, the method including: obtaining a Controller Area Network (CAN) message from a bus of a CAN; obtaining a first voltage level based on the CAN message; and comparing the first voltage level with a preset normal voltage level to determine whether there is an attack.

Alternatively, the CAN message may include a start of frame (SOF) field indicating a start of the CAN message and an arbitration field connected to the SOF field to identify a priority of the CAN message.

Alternatively, the first voltage level is a magnitude of a voltage of a dominant bit generated in the arbitration field included in the CAN message.

Alternatively, the obtaining of the first voltage level based on the CAN message may include: recognizing the SOF field included in the CAN message; recognizing a field connected to the SOF field as the arbitration field; and obtaining the first voltage level generated in the arbitration field.

Alternatively, the comparing of the first voltage level with the preset normal voltage level to determine whether there is an attack may include: determining whether the first voltage level is equal to or higher than the preset normal voltage level; determining whether the arbitration field is over during transmission of the CAN message when the first voltage level is equal to or higher than the preset normal voltage level; and determining that the attack has occurred in a node connected to the CAN bus when it is determined that the arbitration field is over.

Alternatively, the method may further include: obtaining a second voltage level based on the CAN message when it is determined that the attack has occurred; and determining a node that generated the CAN message existing in the bus of the CAN as an attacker node when the second voltage level is equal to or less than the preset normal voltage level.

Alternatively, the second voltage level may be a magnitude of a voltage of a dominant bit generated in the measured CAN message when it is determined that the attack has occurred.

Alternatively, the method may further include transmitting an error message for inactivating the attacker node to the attacker node.

Alternatively, the method may further include obtaining a third voltage level based on the CAN message when the second voltage level is greater than the preset normal voltage level.

Alternatively, the third voltage level may be a magnitude of a voltage of a dominant bit generated in the measured CAN message when the second voltage level is greater than the preset normal voltage level.

In order to solve the foregoing object, another exemplary embodiment of the present disclosure discloses a computer program stored in a computer-readable storage medium, the computer program performing a method of detecting and responding to an attack, the method being performed by a computing device, the method including: obtaining a Controller Area Network (CAN) message from a bus of a CAN; obtaining a first voltage level based on the CAN message; and comparing the first voltage level with a preset normal voltage level to determine whether there is an attack.

In order to solve the foregoing object, another exemplary embodiment of the present disclosure discloses a non-transitory computer readable medium including a computer program, wherein the computer program performing a method of detecting and responding to an attack, the method being performed by a computing device, the method including: obtaining a Controller Area Network (CAN) message from a bus of a CAN; obtaining a first voltage level based on the CAN message; and comparing the first voltage level with a preset normal voltage level to determine whether there is an attack.

According to the present disclosure, it is possible to detect an attack in a Controller Area Network (CAN) and respond to the attack.

The effects of the present disclosure are not limited to the foregoing effects, and other non-mentioned effects will be clearly understood by those skilled in the art from the description below.

BRIEF DESCRIPTION OF THE DRAWINGS

Various aspects are described with reference to the drawings, and herein, like reference numerals are generally used to designate like constituent elements. In the exemplary embodiment below, for the purpose of description, a plurality of specific and detailed matters is suggested in order to provide general understanding of one or more aspects. However, it is apparent that the aspect(s) may be carried out without the specific and detailed matters.

FIG. 1 is a diagram illustrating a system for detecting and responding to an attack according to some exemplary embodiments of the present disclosure.

FIG. 2 is a diagram illustrating CAN High and CAN Low of a bus according to some exemplary embodiments of the present disclosure.

FIG. 3 is a diagram illustrating a CAN message according to some exemplary embodiments of the present disclosure.

FIG. 4 is a diagram illustrating an arbitration process according to some exemplary embodiments of the present disclosure.

FIG. 5 is a diagram illustrating a bus-off attack according to some exemplary embodiments of the present disclosure.

FIG. 6 is a diagram for illustrating a state of a node according to some exemplary embodiments of the present disclosure.

FIG. 7 is a diagram illustrating a voltage level measured in an arbitration field according to some exemplary embodiments of the present disclosure.

FIG. 8 is a flowchart illustrating an example in which a computing device detects and responds to an attack according to some exemplary embodiments of the present disclosure.

FIG. 9 is a schematic and general diagram illustrating an example of a computing environment in which exemplary embodiments of the present disclosure may be implemented.

DETAILED DESCRIPTION

Various exemplary embodiments are described with reference to the drawings. In the present specification, various descriptions are presented for understanding the present disclosure. However, it is obvious that the exemplary embodiments may be carried out even without a particular description.

Terms, "component", "module", "system", and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

A term "or" intends to mean comprehensive "or", not exclusive "or". That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

A term "include" and/or "including" shall be understood as meaning that a corresponding characteristic and/or a constituent element exists. Further, it shall be understood that a term "include" and/or "including" means that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

The term "at least one of A and B" should be interpreted to mean "the case including only A", "the case including only B", and "the case where A and B are combined".

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, such implementation decisions should not be interpreted as causing a departure from the scope of the present disclosure.

The description about the presented exemplary embodiments is provided so as for those skilled in the art to use or carry out the present disclosure. Various modifications of the exemplary embodiments will be apparent to those skilled in the art. General principles defined herein may be applied to other exemplary embodiments without departing from the scope of the present disclosure. Therefore, the present disclosure is not limited to the exemplary embodiments presented herein. The present disclosure shall be interpreted within the broadest meaning range consistent to the principles and new characteristics presented herein.

FIG. 1 is a diagram illustrating a system for detecting and responding to an attack according to some exemplary embodiments of the present disclosure.

The configuration of the system illustrated in FIG. 1 is only a simplified example. In one exemplary embodiment of the present disclosure, the system may include other components, and only some of the disclosed components may constitute the system.

Referring to FIG. 1, the system may include a computing device 100, a plurality of nodes 200 (for example, a first node 200a, a second node 200b, . . . , an $N^{th}$ node 200N), and a bus 300.

The computing device 100 may include a processor 110, a memory 130, and a network unit 150.

The processor 110 may be formed of one or more cores, and may include a processor, such as a central processing unit (CPU), a general purpose graphics processing unit (GPGPU), and a tensor processing unit (TPU) of the computing device, for detecting and responding to an attack.

The memory 130 may store any type of information generated or determined by the processor 110 and any type of information received by the network unit 150. According to the exemplary embodiment of the present disclosure, the memory 130 may include at least one type of storage medium among a flash memory type, a hard disk type, a multimedia card micro type, a card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. The computing device 100 may also be operated in relation to web storage performing a storage function of the memory 130 on the Internet. The description of the foregoing memory is merely illustrative, and the present disclosure is not limited thereto.

In the network unit 150 according to the exemplary embodiment of the present disclosure, a predetermined wire/wireless communication networks capable of transceiving any type of data and signal may be included in the network expressed in the contents of the present disclosure.

The technologies described in the present specification may be used in other networks, as well as the foregoing networks.

Meanwhile, the processor 110 of the computing device 100 according to some exemplary embodiments of the present disclosure may obtain a Controller Area Network (CAN) message from the bus 300 of the CAN.

The CAN may be a communication standard developed to perform communication including data transmission and reception between a plurality of nodes 200 connected through the bus 300. The structure of the CAN may be a structure in which a plurality of nodes (for example, Electronic Control Units (ECUs)) 200 constituting a specific system (for example, vehicle system and equipment system) is connected through the bus 300.

In the CAN, the plurality of nodes 200 is each connected in parallel as masters, and may operate in a multi-master manner of being accessible data transceived in all nodes. Each of the plurality of nodes 200 may generate a CAN message and may be connected to the bus 300 to transmit the CAN message to other nodes through the bus 300.

The bus 300 may refer to an electrical passage commonly used when the computing device 100 and the plurality of nodes 200 transmit data to each other. For example, the bus 300 may be a passage through which CAN messages generated by the plurality of nodes 200 move. The bus 300 includes a plurality of communication lines, and may perform communication by using the plurality of communication lines. For example, the bus 300 may perform communication through a voltage difference between two communication lines of a CAN High (or CAN Hi or CAN-H) and a CAN Low (or CAN Lo or CAN-L). For example, when the first node 200a desires to transmit a dominant bit, a voltage of about 3.5V may flow in the CAN High and a voltage of about 1.5V may flow in the CAN Low in the bus 300. The dominant bit may mean a 0 bit. For another example, when the first node 200a desires to transmit a recessive bit, a voltage of 2.5V may flow in the CAN High and the CAN Low in the bus 300. The recessive bit may mean 1 bit. Accordingly, when the voltage difference between the two communication lines (for example, the CAN High and the CAN Low) is about 2V, the corresponding bit may mean 0 bit, which is the dominant bit. Further, when the voltage difference between the two communication lines is about 0V, the corresponding bit may mean 1 bit, which is the recessive bit. When the dominant bit and the recessive bit are transmitted to the bus 300 at the same time, the bus 300 may be occupied by the dominant bit having a large voltage difference. The plurality of nodes 200 may perform communication through the bus 300 by interpreting and processing 0 bit or 1 bit based on the voltage difference between the two communication lines (for example, the CAN High and the CAN Low).

The CAN message is a message generated in the CAN and may include a message generated to transmit data in the computing device 100 and each of the plurality of nodes 200.

The CAN message may have a form in which a plurality of fields is divided and connected. A plurality of fields may include a Start Of Frame (SOF) field, an arbitration field, a control field, a data field, a Cyclic Redundancy Check (CRC) field, an acknowledgment (ACK)) field, and an End Of Frame (EOF) field. However, the above-described components are not essential for implementing the CAN message, and the CAN message may have more or fewer components than the components listed above.

The SOF field may consist of 1 bit and may indicate the start of a CAN message. Therefore, the SOF field notifies the plurality of nodes 200 connected to the bus 300 that transmission of the CAN message has started, thereby enabling synchronization of the plurality of nodes 200 connected to the bus 300.

The arbitration field may include an ID and a Remote Transmission Request (RTR).

The ID may consist of 11 bits or 18 bits and may be an identifier of a CAN message. The ID may be a value for determining priority. For example, a CAN message may have priority as the ID value is smaller. However, the CAN message is not limited thereto, and may also have priority as the ID value increases.

The RTR consists of 1 bit, and when a first CAN message, which is a data frame, and a second CAN message, which is a remote frame, transmitted simultaneously have the same ID, the RTR may be a value for determining priority. The data frame may refer to a structure including a data field (or payload field). A remote frame may refer to a structure that does not include a data field (or payload field). For example, when the value of the RTR is '0', the corresponding CAN message may be recognized as a data frame. When the value of RTR is '1', the corresponding CAN message may be recognized as a remote frame.

Therefore, it is possible to recognize the first CAN message as a priority by determining the case in which the value of RTR is '0' as the priority between the first CAN message and the second CAN message transmitted at the same time.

The control field may include Identifier Extension (IDE), Reserved, and Data Length Code (DLC).

The IDE consists of 1 bit, and may be a value for distinguishing a standard CAN message and an extended CAN message, which are types of corresponding CAN messages. A standard CAN message may be a CAN message having an ID of 11 bits. The extended CAN message may be a message having an ID of 18 bits. For example, when the value of IDE is 0, the message may be determined as a standard CAN message. Further, when the value of IDE is 1, the message may be determined as an extended CAN message.

The Reserved consists of two 1 bits (for example, r0 and r1), and may be a value used when an ID is later extended (for example, 29 bits). For example, the Reserved may be used to extend an ID to correspond to other communication networks when the Reserved is used in a communication network other than the CAN.

The DLC consists of 4 bits, and may be a value indicating the length of data included in the payload field.

The data field (or payload field) consists of 0 to 64 bits (0 to 8 bytes), and may include a payload that is an actual data value to be transmitted.

The CRC field may include a Cyclic Redundancy Check sequence (CRC sequence) and a Cyclic Redundancy Check delimiter (CRC delimiter).

The CRC sequence consists of 15 bits, and may be a value calculated based on a specific algorithm at the transmission node. Therefore, a receiving node may determine whether a bit error exists in the CAN message by calculating the value of the CRC sequence based on the specific algorithm described above.

The CRC delimiter consists of 1 bit, and may indicate the end of the CRC field.

The ACK field may include an acknowledgment slot (ACK slot) and an acknowledgment delimiter (ACK delimiter).

The ACK slot consists of 1 bit, and may be a value for determining whether normal reception of the CAN message has been completed. For example, when it is determined that the CRC sequence is normal as a result of the check of the CRC sequence, the ACK slot may include a value of '0'. Further, when it is determined that the CRC sequence is abnormal as a result of the check of the CRC sequence, the ACK slot may include a value of '1'.

The ACK delimiter consists of 1 bit, and may indicate the end of an ACK field.

The frame end field consists of 7 bits, and may indicate the end of the frame of the CAN message. For example, the frame end field may consist of '1111111', which is 7 bits.

Meanwhile, when the bus 300 is in an idle state, the plurality of nodes 200 may also simultaneously transmit CAN messages. When two or more nodes among the plurality of nodes 200 transmit a CAN message at the same time, through the arbitration process in the arbitration field in the CAN message, only the CAN message of a node having a higher priority may occupy the bus 300 and be transmitted.

When an error occurs during communication performed through the bus 300, the processor 110 of the computing device 100 performs error handling (for example, bit error). The bit error may be an error occurring when a bit transmitted from a node transmitting a CAN message and a bit monitored in the bus 300 do not match each other, in a situation except for the above-described arbitration process.

The processor 110 may respond to an error through a fault confinement mechanism after processing the error. The fault confinement mechanism may be a method of responding to errors by defining the plurality of nodes 200 as three states (for example, an error active state, an error passive state, a bus-off state). For example, in the plurality of nodes 200, counters called a Transmit Error Counter (TEC) and a Receiver Error Counter (REC) are defined, and when each of the plurality of nodes 200 detects an error during message transmission, the TEC is increased, and when each of the plurality of nodes 200 detects an error during message reception, REC may be increased. For example, when the first node 200a recognizes an error while transmitting a message, the TEC of the first node 200a may increase by 8. A state of each of the plurality of nodes 200 may be determined by the two error counters.

The error active state is an initial state (default) of each of the plurality of nodes 200, and each of the TEC and the REC may start with 0. When a node in the error active state recognizes an error during communication, the node may notify other nodes of the error by transmitting an active error flag (000000). Each of the plurality of nodes 200 may be switched to an error passive state when the TEC or the REC exceeds 127 due to a continuous error. When a node in the error passive state recognizes an error, the node transmits a passive error flag (111111), which may not have any effect on the bus 300. Further, each of the plurality of nodes 200 can be switched to a bus-off state when the TEC exceeds 255. The bus-off state may mean a state in which communication is impossible. Therefore, the node in the Bus-off state may no longer be able to perform CAN communication. When 11 consecutive recessive bits are monitored 128 times in the bus 300, the node in the bus-off state is switched back to the error active state and is able to perform CAN communication through the bus 300.

A bus-off attack may be an attack that intentionally switches a target node into the bus-off state by using the error processing and the fault confinement mechanism. Specifically, a bus-off attack may be performed through an attacker node. An attacker node may be a node forged or modulated by an attacker among a plurality of nodes 200 connected to the bus 300. Also, the attacker node may be a node physically connected to the bus 300 for the purpose of attack.

The attacker node performing a bus-off attack may generate an error while the target node is transmitting a CAN message so that the TEC of the target node increases. The bus 300 may occupy only one node (that is, the CAN message generated by one node) after the arbitration field. In addition, the CAN messages may be periodically transmitted at preset times set differently from each other. Accordingly, the attacker node may transmit the CAN message at the same time as the time of the transmission of the CAN Message by the target node. Further, the attacker node may generate an error to increase the TEC of the target node.

The processor 110 may obtain a first voltage level based on the CAN message. The processor 110 may obtain a first voltage level generated in the arbitration field in which the attacker node and the target node simultaneously transmit the CAN message in order to detect a bus-off attack. The first voltage level may be a magnitude of a voltage of a dominant bit generated in the arbitration field included in the CAN message.

For example, the processor 110 may recognize the SOF field included in the CAN message. The SOF field may indicate the start of the CAN message. The SOF field notifies the plurality of nodes 200 connected to the bus 300 that message transmission has started, so that the plurality of nodes 200 connected to the bus 300 may be synchronized. Accordingly, the processor 110 may recognize the start point of the CAN message by recognizing the SOF field included in the CAN message.

The processor 110 may recognize a field connected to the SOF field as the arbitration field. The arbitration field may be connected to the SOF field to identify the priority of the CAN message. Accordingly, the processor 110 may recognize a field immediately following the SOF field as the arbitration field.

The processor 110 may obtain the first voltage level generated in the arbitration field. The processor 110 may measure and obtain the first voltage level generated in the arbitration field through a sensor unit (not illustrated) included in the computing device 100. The sensor unit may include one or more sensors connected to the bus 300 to sense the state of the bus 300. For example, the sensor unit may include a voltmeter capable of monitoring the bus 300 and measuring a voltage level. However, the sensor unit is not limited thereto, and various sensors may be used alone or in combination to monitor the bus 300 and measure the voltage level.

The processor 110 may compare the first voltage level with a preset normal voltage level to determine whether there is an attack. For example, the processor 110 may determine whether the first voltage level is equal to or greater than a preset normal voltage level.

Here, the processor 110 may obtain a new and different CAN message from the bus 300 of the CAN when the first voltage level is less than the preset normal voltage level. Also, the processor 110 may obtain a new voltage level based on the new CAN message. The processor 110 may compare the new voltage level with the preset normal voltage level to determine whether there is an attack.

In addition, the processor 110 may determine whether the arbitration field is over during transmission of the CAN message when the first voltage level is equal to or higher than the preset normal voltage level.

Herein, when the processor 110 determines that the arbitration field is not over, the processor 110 may obtain a voltage level generated in the arbitration field of the CAN message again, and compare the corresponding voltage level with the preset normal voltage level. Subsequent processes are omitted because the subsequent processes proceed similarly to the case where the first voltage level is less than or greater than the preset normal voltage level.

The processor 110 may determine that an attack has occurred in the node connected to the bus 300 of the CAN when it is determined that the arbitration field is over. Specifically, the meaning that the first voltage level is greater than the preset normal voltage level may be that a plurality of CAN messages exist in the bus 300. In a normal situation, since IDs of a plurality of CAN messages are different, only one CAN message may always exist before the last bit of the arbitration field. However, in the case of an abnormal situation under attack, since a plurality of CAN messages exist before the last bit of the arbitration field, the voltage level may be greater than the preset normal voltage level even when the arbitration field is over. Therefore, when the voltage level is greater than the preset normal voltage level even after the arbitration field is over, the processor 110 may determine that the node (for example, the plurality of nodes 200) connected to the bus 300 of the CAN is attacked.

When it is determined that the attack has occurred, the processor 110 may obtain a second voltage level based on the CAN message. The second voltage level may be a magnitude of a voltage of a dominant bit generated in the measured CAN message when it is determined that an attack has occurred.

For example, the processor 110 may determine the node that generated the CAN message existing in the bus 300 of the CAN as an attacker node when the second voltage level is equal to or less than the preset normal voltage level. The meaning that the second voltage level is equal to or less than the preset normal voltage level may be that only one CAN message exists among a plurality of CAN messages existing in the bus 300 due to the occurrence of the attack. Therefore, the CAN message remaining in the bus 300 until the end may be an abnormal message remaining after attacking the CAN message generated in a normal node to generate an error. Therefore, the processor 110 may determine that the CAN message existing in the bus 300 is an abnormal message, and determine the node that generated the CAN message as an attacker node when the second voltage level is equal to or less than the preset normal voltage level. The processor 110 may transmit an error message for inactivating the attacker node to the attacker node. For example, the processor 110 may increase the TEC of the attacker node by 8 by transmitting an active error flag (000000) to the attacker node to generate a bit error. Therefore, when the attacker node continuously attempts a bus-off attack, the processor 110 may bus-off the attacker node by continuously transmitting an error message to the attacker node. In addition, the processor 110 may stop the transmission of the CAN message existing in the bus 300 of the CAN when the second voltage level is equal to or less than the preset normal voltage level. Here, the CAN message existing in the bus 300 may be an abnormal message generated by the attacker node. Accordingly, the processor 110 may prevent damage to other nodes by stopping transmission of the corresponding CAN message.

For another example, the processor 110 may obtain a third voltage level based on the CAN message when the second voltage level is greater than the preset normal voltage level. The third voltage level may be a magnitude of a voltage of a dominant bit generated in the measured CAN message when the second voltage level is greater than the preset normal voltage level.

Meanwhile, the plurality of nodes 200 may refer to any type of nodes in a system having a mechanism for communication with the computing device 100. For example, the plurality of nodes may be a device including an ECU. Each of the plurality of nodes 200 is connected in parallel as a master, and may operate in a multi-master manner capable of accessing data transmitted and received from all nodes. Each of the plurality of nodes 200 may generate a CAN message and may be connected to the bus 300 to transmit the CAN message to other nodes through the bus 300.

Meanwhile, the bus 300 may refer to an electrical passage commonly used when the computing device 100 and the plurality of nodes 200 transmit data to each other. For example, the bus 300 may be a passage through which CAN messages generated by the plurality of nodes 200 move.

FIG. 2 is a diagram illustrating CAN High and CAN Low of a bus according to some exemplary embodiments of the present disclosure.

Referring to FIG. 2, the bus 300 may perform communication through a voltage difference between two communication lines of a CAN High (or CAN Hi or CAN-H) and a CAN Low (or CAN Lo or CAN-L). For example, when the first node 200a desires to transmit a dominant bit, a voltage of about 3.5V may flow in the CAN High and a voltage of about 1.5V may flow in the CAN Low in the bus 300. The dominant bit may mean a 0 bit. For another example, when the first node 200a desires to transmit a recessive bit, a voltage of 2.5V may flow in the CAN High and the CAN Low in the bus 300. The recessive bit may mean 1 bit. Accordingly, when the voltage difference between the two communication lines (for example, the CAN High and the CAN Low) is about 2V, the corresponding bit may mean 0 bit, which is the dominant bit. Further, when the voltage difference between the two communication lines is about 0V, the corresponding bit may mean 1 bit, which is the recessive bit.

FIG. 3 is a diagram illustrating a CAN message according to some exemplary embodiments of the present disclosure.

Referring to FIG. 3, the CAN message may have a form in which a plurality of fields is divided and connected. A plurality of fields may include a Start Of Frame (SOF) field, an arbitration field, a control field, a data field, a Cyclic Redundancy Check (CRC) field, an acknowledgment (ACK)) field, and an End Of Frame (EOF) field. However, the above-described components are not essential for implementing the CAN message, and the CAN message may have more or fewer components than the components listed above.

The SOF field may consist of 1 bit and may indicate the start of a CAN message. Accordingly, the SOF field notifies all nodes connected to the bus that message transmission has started, thereby enabling synchronization of all nodes connected to the bus.

The arbitration field may include an ID and a Remote Transmission Request (RTR).

The ID may consist of 11 bits or 18 bits and may be an identifier of a CAN message. The ID may be a value for determining priority. For example, a CAN message may have priority as the ID value is smaller. However, the CAN message is not limited thereto, and may also have priority as the ID value increases.

The RTR consists of 1 bit, and when a first CAN message, which is a data frame, and a second CAN message, which is a remote frame, transmitted simultaneously have the same ID, the RTR may be a value for determining priority. The data frame may refer to a structure including a payload field. The remote frame may mean a structure that does not include a payload field. For example, when the value of the RTR is '0', the corresponding CAN message may be recognized as a data frame. When the value of RTR is '1', the corresponding CAN message may be recognized as a remote frame.

Therefore, it is possible to recognize the first CAN message as a priority by determining the case in which the value of RTR is '0' as the priority between the first CAN message and the second CAN message transmitted at the same time.

The control field may include Identifier Extension (IDE), reserved, and Data Length Code (DLC).

The IDE consists of 1 bit, and may be a value for distinguishing a standard CAN message and an extended CAN message, which are types of corresponding CAN messages. A standard CAN message may be a CAN message having an ID of 11 bits. The extended CAN message may be a message having an ID of 18 bits. For example, when the value of IDE is 0, the message may be determined as a standard CAN message. Further, when the value of IDE is 1, the message may be determined as an extended CAN message.

The Reserved consists of two 1 bits (for example, r0 and r1), and may be a value used when an ID is later extended (for example, 29 bits). For example, the Reserved may be used to extend an ID to correspond to other communication networks when the Reserved is used in a communication network other than the CAN.

The DLC consists of 4 bits, and may be a value indicating the length of data included in the payload field.

The data field (or payload field) consists of 0 to 64 bits (0 to 8 bytes), and may include a payload that is an actual data value to be transmitted.

The CRC field may include a Cyclic Redundancy Check sequence (CRC sequence) and a Cyclic Redundancy Check delimiter (CRC delimiter).

The CRC sequence consists of 15 bits, and may be a value calculated based on a specific algorithm at the transmission node. Therefore, a receiving node may determine whether a bit error exists in the CAN message by calculating the value of the CRC sequence based on the specific algorithm described above.

The CRC delimiter consists of 1 bit, and may indicate the end of the CRC field.

The ACK field may include an acknowledgment slot (ACK slot) and an acknowledgment delimiter (ACK delimiter).

The ACK slot consists of 1 bit, and may be a value for determining whether normal reception of the CAN message has been completed. For example, when it is determined that the CRC sequence is normal as a result of the check of the CRC sequence, the ACK slot may include a value of '0'. Further, when it is determined that the CRC sequence is abnormal as a result of the check of the CRC sequence, the ACK slot may include a value of '1'.

The ACK delimiter consists of 1 bit, and may indicate the end of an ACK field.

The frame end field consists of 7 bits, and may indicate the end of the frame of the CAN message. For example, the frame end field may consist of '1111111', which is 7 bits.

FIG. 4 is a diagram illustrating an arbitration process according to some exemplary embodiments of the present disclosure.

Referring to FIG. 4, ECU A, B, and C (the first node 200a, the second node 200b, and the third node) may recognize that the CAN bus (bus 300) is in an idle state, and perform the transmission of the CAN messages. Here, the CAN ID of the CAN message transmitted by each ECU may be 0x10A for ECU A, 0x13F for ECU B, and 0x10F for ECU C. After the three ECUs transmit the start (SOF) bit, in the $6^{th}$ bit of the ID field, ECU B transmits the recessive bit (1) and ECU A and C transmit the dominant bit (0), so that ECU B may lose in the arbitration process and stop the transmission of the data frames. Since ECU A transmits the dominant bit (0) in the $9^{th}$ bit of the ID field while continuing to transmit the CAN message, ECU A and ECU C win in terms of the priority and may occupy the bus 300 to transmit CAN messages. ECU C loses in the arbitration process just like ECU B and may stop transmitting CAN messages. After the successful CAN message transmission of ECU A, ECU B and ECU C may perform CAN message transmission again after checking the idle state of the bus 300. Accordingly, the ECU transmitting the CAN message having a higher ID priority (that is, a smaller ID hex value) may be selected in the arbitration process and transmit the CAN message.

FIG. 5 is a diagram illustrating a bus-off attack according to some exemplary embodiments of the present disclosure.

Referring to FIG. 5, the attacker node (attack ECU) transmits a CAN message that transmits a dominant bit (0 bit) to the location where the target node (target ECU) transmits a recessive bit (1 bit) to generate a bit error. Specifically, the attacker node may simultaneously transmit a CAN message having the same ID as that of the CAN message transmitted by the target node to pass the arbitration process, and generate an error in the second bit of the DLC after the arbitration field. Due to the error, the TEC of the target node may increase. The attacker node may forcibly switch the target node to the bus-off state by repeating the above process.

FIG. 6 is a diagram for illustrating a state of a node according to some exemplary embodiments of the present disclosure.

Referring to FIG. 6, the processor 110 may respond to an error through a fault confinement mechanism after error processing. The fault confinement mechanism may be a method of responding to an error by defining the plurality of nodes 200 as three states (for example, an error Active state, an error Passive state, and a bus-off state). For example, in the plurality of nodes 200, counters called a Transmit Error Counter (TEC) and a Receiver Error Counter (REC) are defined, and each of the plurality of nodes 200 may increase the TEC when an error is detected while transmitting a message, and increase REC when an error is detected while the ECU is receiving a message. For example, when the first node 200a recognizes an error while transmitting a message, the TEC of the first node 200a may increase by 8. A state of each of the plurality of nodes 200 may be determined by the two error counters.

The error active state is an initial state (default) of each of the plurality of nodes 200, and each of the TEC and the REC may start with 0. When a node in the error active state recognizes an error during communication, the node may notify other nodes of the error by transmitting an active error flag (000000). Each of the plurality of nodes 200 may be switched to an error passive state when the TEC or the REC exceeds 127 due to a continuous error. When a node in the error passive state recognizes an error, the node transmits a passive error flag (111111), which may not have any effect on the bus 300. Further, each of the plurality of nodes 200 can be switched to a bus-off state when the TEC exceeds 255. The node in the bus-off state may no longer be able to perform CAN communication. When 11 consecutive recessive bits are monitored 128 times in the bus 300, the node in the bus-off state is switched back to the error active state and is able to perform CAN communication through the bus 300.

FIG. 7 is a diagram illustrating a voltage level measured in an arbitration field according to some exemplary embodiments of the present disclosure.

Referring to a first monitoring graph 10 of FIG. 7, when one node transmits a CAN message to the bus 300, the processor 110 recognizes that the voltage level is 2.0V in the dominant bit (0 bit) area.

However, referring to a second monitoring graph 20, when two or more nodes transmit CAN messages to the bus 300, since both nodes send voltage to the CAN High and the CAN Low at the same time, the processor 110 may recognize that the voltage level is equal to or greater than a preset normal voltage level (for example, (2.0+δ)V) in the dominant bit (0 bit) area. Here, δ may be a value previously set through voltage level analysis.

Under the normal situation, since the IDs of the CAN messages transmitted by the two nodes are different, one node may always lose priority in the arbitration process before the last bit of the arbitration field. Accordingly, in the normal situation, the processor 110 may recognize that the voltage level representing the dominant bit (0 bit) is 2.0V at the end of the arbitration field. That is, when the processor 110 monitors the voltage level of the dominant bit (0 bit) is equal to or greater than the preset normal voltage level (for example, (2.0+δ)V) until the end of the arbitration field, the processor 110 may recognize the situation as an abnormal situation and determine that an attack (for example, the bus-off attack) has occurred.

FIG. 8 is a flowchart illustrating an example in which a computing device detects and responds to an attack according to some exemplary embodiments of the present disclosure.

Referring to FIG. 8, the processor 110 of the computing device 100 may obtain a CAN message from the bus 300 of the CAN (S110).

The CAN message may include a start of frame (SOF) field indicating the start of the CAN message and an arbitration field connected to the SOF field to identify the priority of the CAN message.

The processor 110 may obtain a first voltage level based on the CAN message (S120).

For example, the processor 110 may recognize the SOF field included in the CAN message. The processor 110 may recognize a field connected to the SOF field as the arbitration field. Also, the processor 110 may obtain the first voltage level generated in the arbitration field.

The first voltage level may be a magnitude of a voltage of a dominant bit generated in the arbitration field included in the CAN message.

The processor 110 may compare a first voltage level with a preset normal voltage level to determine whether an attack has occurred (S130).

For example, the processor 110 may determine whether the first voltage level is equal to or greater than a preset normal voltage level. When the first voltage level is equal to or higher than the preset normal voltage level, the processor 110 may determine whether the arbitration field is over during transmission of the CAN message. Further, when it is determined that the arbitration field is over, the processor 110 may determine that an attack has occurred in the node connected to the CAN bus.

When it is determined that the attack has occurred, the processor 110 may obtain a second voltage level based on the CAN message.

The processor 110 may determine the node that generated the CAN message present on the CAN bus as an attacker node when the second voltage level is less than or equal to the preset normal voltage level. The second voltage level may be a magnitude of a voltage of a dominant bit generated in the measured CAN message when it is determined that an attack has occurred. Accordingly, when it is determined that the attack has occurred, the processor 110 may measure and obtain the second voltage level, which is the magnitude of the voltage of the dominant bit generated in the CAN message. The processor 110 may transmit an error message for inactivating the attacker node to the attacker node.

Also, the processor 110 may obtain a third voltage level based on the CAN message when the second voltage level is greater than the preset normal voltage level. The third voltage level may be a magnitude of a voltage of a dominant bit generated in the measured CAN message when the second voltage level is greater than the preset normal voltage level. Accordingly, the processor 110 may measure and obtain the third voltage level, which is the magnitude of the voltage of the dominant bit generated in the CAN message, when the second voltage level is greater than the preset normal voltage level.

The operations illustrated in FIG. 8 are illustrative operations. Accordingly, it will also be apparent to those skilled in the art that some of the operations in FIG. 8 may be omitted or additional operations may be present without departing from the scope of the present disclosure. In addition, specific details of the configurations 100 to 300 described in FIG. 8 may be replaced with those previously described with reference to FIGS. 1 to 7.

When a node closely related to safety is switched to the bus-off state due to the bus-off attack in the CAN, the node cannot perform normal CAN communication, which may seriously affect the driver's safety.

As described above with reference to FIGS. 1 to 8, the computing device 100 according to some exemplary embodiments of the present disclosure may detect a bus-off attack by monitoring a voltage difference of the arbitration field included in the CAN message.

In addition, after detecting a bus-off attack, the computing device 100 may stop transmission of a CAN message transmitted by an attacker node and bus-off the attacker node. Therefore, the computing device 100 not only detects the bus-off attack and determines whether an attack is occurred, but also reverse-attacks the attacking node to prevent normal nodes from being switched to the bus-off state, thereby improving safety. In addition, the computing device 100 may improve the security of the in-vehicle network by combining with various automotive Intrusion Detection Systems (IDS).

FIG. 9 is a simple and general schematic diagram illustrating an example of a computing environment in which exemplary embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transmission medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multiprocessor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an exterior mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics presented herein.

What is claimed is:

1. A computer-implemented method for detecting and responding to an attack on a Controller Area Network (CAN), the method comprising:
   obtaining a CAN message from a bus of the CAN, the CAN message including a start of frame (SOF) field indicating a start of the CAN message, and an arbitration field connected to the SOF field to identify a priority of the CAN message;
   obtaining a first voltage level based on the CAN message;
   comparing the first voltage level with a preset normal voltage level; and
   determining that there is an attack on the CAN, based on the comparison of the first voltage level with the preset normal voltage level,
   wherein the determination includes:
      determining that the first voltage level is equal to or higher than the preset normal voltage level;
      determining that the arbitration field is over during transmission of the CAN message in response to the first voltage level being equal to or higher than the preset normal voltage level; and
      determining that the attack has occurred in a node connected to the CAN bus in response to the determination that that the arbitration field is over.

2. The method of claim 1, wherein the first voltage level comprises a magnitude of a voltage of a dominant bit generated in the arbitration field included in the CAN message.

3. The method of claim 1, wherein the obtaining of the first voltage level based on the CAN message includes:
   recognizing the SOF field included in the CAN message;
   recognizing a field connected to the SOF field as the arbitration field; and
   obtaining the first voltage level generated in the arbitration field.

4. The method of claim 1, further comprising:
   obtaining a second voltage level based on the CAN message in response to the determination that the attack has occurred; and
   designating a node that generated the CAN message existing in the bus of the CAN as an attacker node in response to the second voltage level being equal to or less than the preset normal voltage level.

5. The method of claim 4, wherein the second voltage level comprises a magnitude of a voltage of a dominant bit generated in the measured CAN message in response to the determination that the attack has occurred.

6. The method of claim 4, further comprising:
   transmitting an error message for inactivating the attacker node to the attacker node.

7. The method of claim 4, further comprising:
   obtaining a third voltage level based on the CAN message in response to the second voltage level being greater than the preset normal voltage level.

8. The method of claim 7, wherein the third voltage level comprises a magnitude of a voltage of a dominant bit generated in the measured CAN message in response to the second voltage level being greater than the preset normal voltage level.

9. A non-transitory machine-readable recording medium storing instructions that, when executed by a computer, cause the computer to perform operations to detect and respond to an attack on a Controller Area Network (CAN), the method comprising:
   obtaining a CAN message from a bus of the CAN, the CAN message including a start of frame (SOF) field indicating a start of the CAN message, and an arbitration field connected to the SOF field to identify a priority of the CAN message;
   obtaining a first voltage level based on the CAN message;
   comparing the first voltage level with a preset normal voltage level; and
   determining whether there is an attack on the CAN, based on the comparison of the first voltage level with the preset normal voltage level,
   wherein the determination includes:
      determining that the first voltage level is equal to or higher than the preset normal voltage level;
      determining that the arbitration field is over during transmission of the CAN message in response to the first voltage level being equal to or higher than the preset normal voltage level; and
      determining that the attack has occurred in a node connected to the CAN bus in response to the determination that that the arbitration field is over.

10. A computing device, comprising:
    a processor;
    a memory; and
    a Controller Area Network (CAN) network including a bus,
    wherein the processor is configured to:
       obtain a CAN message from the bus of the CAN, the CAN message including a start of frame (SOF) field indicating a start of the CAN message, and an arbitration field connected to the SOF field to identify a priority of the CAN message,
       obtain a first voltage level based on the CAN message;

compare the first voltage level with a preset normal voltage level; and determine that there is an attack on the CAN, based on the comparison of the first voltage level with the preset normal voltage level, wherein the processor is further configured to:

determine that the first voltage level is equal to or higher than the preset normal voltage level;

determine whether the arbitration field is over during transmission of the CAN message in response to the first voltage level being equal to or higher than the preset normal voltage level; and determine that the attack has occurred in a node connected to the CAN bus in response to the determination that the arbitration field is over.

* * * * *